Feb. 17, 1925.
F. J. WEST
STORAGE BATTERY PLATE SEPARATOR
Original Filed April 15, 1922
1,526,889
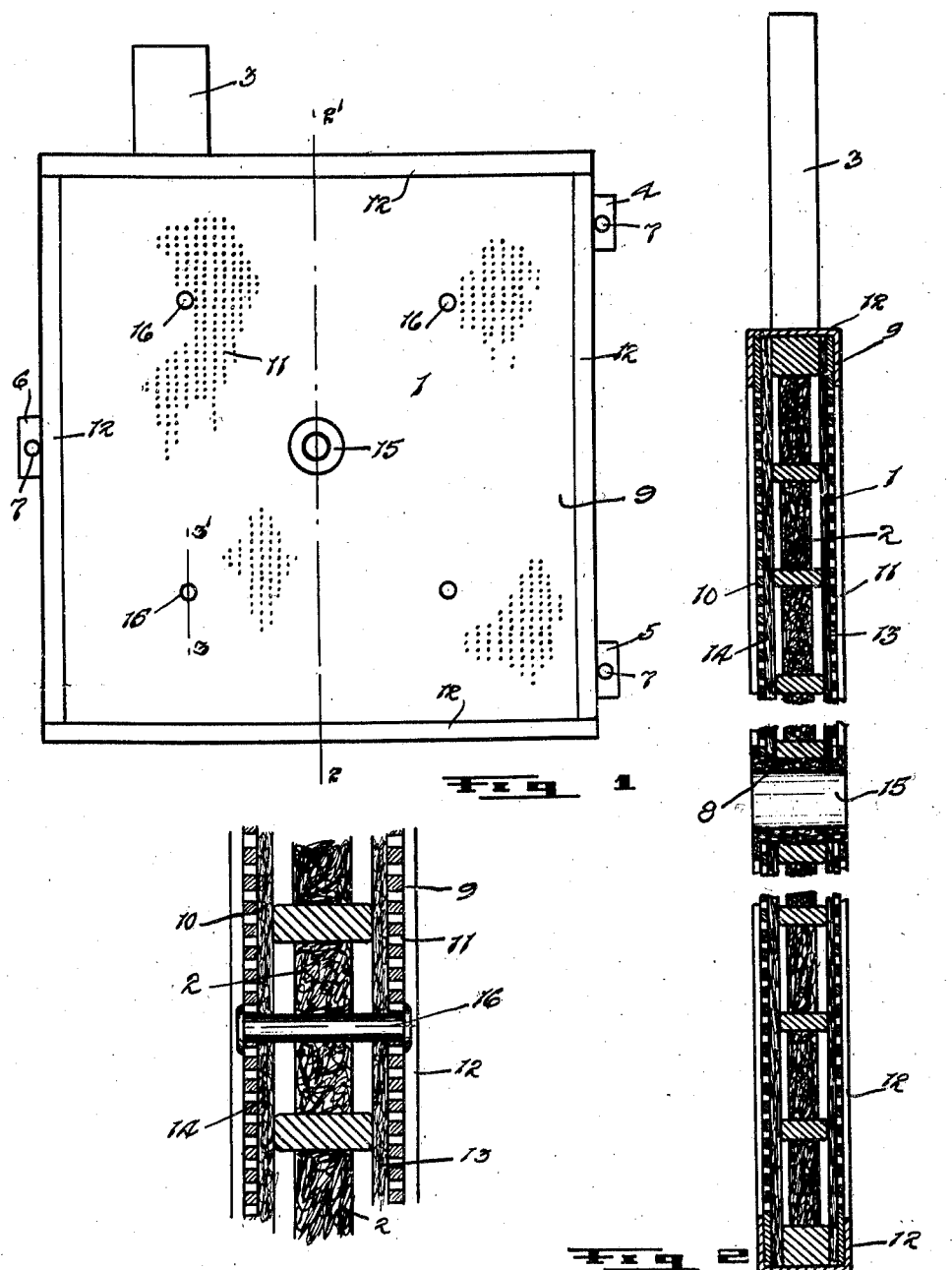
INVENTOR
F. J. West
By Patented Feb. 17, 1925.

1,526,889

UNITED STATES PATENT OFFICE.

FREDERICK JAMES WEST, OF WINNIPEG, MANITOBA, CANADA.

STORAGE-BATTERY-PLATE SEPARATOR.

Original application filed April 15, 1922, Serial No. 553,032. Divided and this application filed April 9, 1923. Serial No. 630,929.

*To all whom it may concern:*

Be it known that I, FREDERICK JAMES WEST, of the city of Winnipeg, in the Province of Manitoba, Canada, have invented certain new and useful Improvements in Storage-Battery-Plate Separators, of which the following is the specification.

The invention relates to improvements in storage battery plate separators, the present application being a division of my pending application No. 553032 filed the 15th day of April, 1922, for storage batteries.

An object of the invention is to provide separators associated with the positive electrodes or plates of the battery, the separators not only positively separating the positive and negative plates but preventing the loosening and scaling off of the active material of the positive plate and thereby not only materially increasing the life of the positive plate but also preventing the accumulation of sediment in the bottom of the battery.

A further object is to provide a separator constructed to permit of the bolting together of the battery plates, thereby permitting of the removal of the plates as a unit and also preventing any tendency of the plates to buckle.

With the above more important objects in view the invention consists essentially in the arrangement and construction of parts hereinafter more particularly described and later pointed out in the appended claims, reference being had to the accompanying drawing in which:—

Fig. 1 is a face view of one of the positive plates and enclosed within my separator.

Fig. 2 is an enlarged detailed vertical sectional view at 2—2' Figure 1.

Fig. 3 is an enlarged detailed vertical sectional view at 3—3' Figure 1.

In the drawing like characters of reference indicate corresponding parts in the several figures.

According to my invention the positive and negative plates of the battery are similarly constructed with the exception that the positive plates are enclosed within a specially designed separator. The positive plates or electrodes 1 are of the usual grid formation with the paste or active material 2 carried by the grid. The grid is supplied at the top with an extending terminal 3 and at one end with two spaced upper and lower end lugs 4 and 5 and at the other end with a centrally spaced end lug 6, the lugs being provided with cross openings 7. These lugs are utilized for a purpose fully disclosed in my co-pending application hereinbefore referred to.

Centrally the grid of the plate or electrode is supplied with an opening 8. The positive plate or electrode is enclosed within a perforated acid resisting casing or envelope 9 formed in the present instance from celluloid, there being perforated sheets 10 and 11 of celluloid at each side of the plate and connecting celluloid bands 12 spanning the edges of the plates and cemented to the edges of the side sheets. The lugs and the terminal protrude through the envelope.

Between the side sheets of the envelope and the grid I insert asbestos or such like sheets or pads 13 and 14. A central celluloid or such like acid resisting ferrule 15 passes through the opening 8 of the grid and through the pads and the side sheets and the outflaring ends or flanges of the ferrule are cemented to the side sheets and they act to hold the envelope from spreading at this point. Suitably positioned celluloid or such like acid resisting pins 16 are also passed through the plate and envelope at intervals, such pins having their ends riveted so that they effectively hold the envelope sides in place.

The negative plates utilized in my battery are of the same grid type as the positive plates and are provided with the usual negative paste and are fitted with lugs and negative terminals. They are also supplied with a central opening corresponding to that 8 of the positive plates.

Accordingly after the positive and negative plates have been assembled in the usual manner they can be bolted together by passing celluloid or such like acid resisting bolts through the central openings of all plates. This firmly holds the plates together, allows them to be lifted as a unit and prevents any tendency at buckling of the plates.

The separator which I provide for the positive plate entirely encases the same whilst allowing of the effective action of the electrolyte on the plate. There is no possibility of internal short circuiting as the separator positively separates the negative from the positive plates and the very nature of the separator is such that the active material of the plates is positively prevented from loosening and scaling off. A further feature is that there is no possibility of sediment accumulating in the bottom of the battery employing my plates.

What I claim as my invention is:—

1. In combination, a positive electrode having a central transverse opening therein, perforated celluloid plates positioned at the sides of the electrode, celluloid bands connecting the plates and cemented thereto, the bands enclosing the sides and ends of the electrode, asbestos pads inserted between the plates and the electrode and a ferrule passing through the opening in the electrode and through the pads and side plates and having the ends cemented to the side plates, such ferrule providing an opening for fastening means to connect several similar plates.

2. In combination, a positive electrode having a central and other suitably positioned openings therein, asbestos pads covering and engaging the sides of the electrode, perforated celluloid plates covering the outer sides of the pads, celluloid bands enclosing all sides of the electrode and cemented to the edges of the celluloid plates, a ferrule passing through the central opening and having flared ends cemented to the side plates and celluloid pins passing through the other openings and cemented to the side plates, said pins holding the side plates and pads against the electrode and said ferrule providing an opening for attaching means passing therethrough to connect several of such electrodes together.

Signed at Winnipeg this 4th day of April, 1923.

FREDERICK JAMES WEST.

In the presence of:
GERALD S. ROXBURGH,
W. C. BOGGISS.